United States Patent [19]

Fukuda et al.

[11] 3,950,284

[45] Apr. 13, 1976

[54] POLYMER DISPERSED LIQUID

[75] Inventors: Tadanori Fukuda; Masao Takahashi; Keiko Kawamura, all of Otsu, Japan

[73] Assignee: Toray Industries, Inc., Tokyo, Japan

[22] Filed: July 24, 1974

[21] Appl. No.: 491,615

[30] Foreign Application Priority Data

July 28, 1973 Japan................................ 48-85273

[52] U.S. Cl............. 260/17 A; 260/33.6 R; 260/856
[51] Int. Cl.²........................................... C08L 1/14
[58] Field of Search................. 260/17 A, 33.6, 856

[56] References Cited
UNITED STATES PATENTS

| | | | |
|---|---|---|---|
| 3,491,039 | 1/1970 | Takahashi et al...................... | 260/17 |
| 3,702,836 | 11/1972 | Walbridge...................... | 260/29.1 R |
| 3,812,075 | 5/1974 | Burdett et al........................ | 260/856 |
| 3,821,145 | 6/1974 | Walus.................................. | 260/856 |

FOREIGN PATENTS OR APPLICATIONS 1,052,241   12/1966   United Kingdom

*Primary Examiner*—Donald E. Czaja
*Assistant Examiner*—Edward Woodberry

[57] ABSTRACT

A polymer dispersed liquid is prepared by the following steps: (1) polymerzing at least two different types of monomers of the vinyl series in the presence of a block or graft copolymer of the vinyl series containing a component solvating in a dispersion medium ($\alpha$) and a component not solvating in the dispersion medium, but being compatible with a dispersed polymer ($\beta$) in an organic liquid in which a copolymer of the vinyl series to be produced is soluble; then at that time, uniformly admixing an alkylated melamine-formaldehyde reaction product before, during or after the polymerization, (2) distilling out a part of the organic liquid, thereby varying the solubility parameter of the organic liquid of said polymer solution by more than about 0.5.

3 Claims, No Drawings

POLYMER DISPERSED LIQUID

BACKGROUND OF THE INVENTION

The present invention relates to a stable organic liquid dispersed copolymer of the vinyl series formed from a plurality of components having various polarities, and to a method of making the same.

The present invention is especially suitable for preparing a stable organic liquid dispersed liquid of a polymer containing a hardening functional group in the molecule.

It is known to prepare a stable dispersed liquid of a vinyl polymer by polymerizing the vinyl monomer in an organic liquid, thereby forming dispersed particles of the vinyl polymer which are insoluble in said organic liquid, characterized by polymerizing in the presence of a compound containing a component which is to be solvated by the organic liquid, and a vinyl group copolymerizable with said monomer. This procedure has been proposed in Japanese patent application publication No. 19186/1965.

In such process, when two or more vinyl monomers which are remarkably different in polarity are copolymerized, it is recognized that the composition and its characteristic values such as degree of polymerization of the resulting copolymer, vary remarkably in respect of ratio of polymerization. They accordingly become non-uniform, which is undesirable for many practical purposes. This is perhaps because the polymerization rate and the copolymerization reaction ratio differ with the size or difference of polarity between the respective monomers and the organic liquid.

For improving upon this irregularity, a process has been proposed which comprises adding a monomer having high polarity to the reaction system during the polymerization reaction (Japanese patent application publication No. 20303/1968).

However, uniformity of composition is especially required when producing a copolymer from a multi-component (in many cases 4- or 6-component) monomer, wherein the respective components differ remarkably in polarity such as, for example, producing a thermosetting copolymer, or for producing low molecular weight copolymers such as for paints, for example. Therefore, the process of Japanese patent application publication No. 20303/1968 cannot be called an effective process for the purpose. In a polymer dispersed liquid, especially when a thermosetting polymer is used, the speed or degree of setting tends to become a problem. Specifically, when the thermosetting polymer uses a cross-linking agent such as, for example, an alkylated amino resin, setting is unlikely to proceed sufficiently unless these cross-linking agents are completely contained in the polymer particles. This is perhaps due to the fact that cross-linking takes place only locally. Accordingly, various special expedients have been used for the preparation of a polymer dispersed liquid using a cross-linking agent.

For example, a process has been proposed for preparing a polymer dispersed liquid which comprises dissolving an alkylated amino resin in a non-aqueous solvent, adding to the resulting solution a first active ethene monomer and a second active ethene monomer each having a functional epoxy group, respectively and copolymerizing both of these ethene monomers (however, not containing a functional hydroxyl group, respectively) in the presence of an alkylated amino resin (Japanese published patent applications Nos. 8537/1972 and 11838/1972).

Further, a process has been proposed for preparing a polymer dispersed liquid which comprises reacting a pre-reaction agent having a group which can be condensed with a melamine-formaldehyde resin and a double bond copolymerizable with a melamine-formaldehyde resin, with a melamineformaldehyde resin thereby preparing a copolymerizable alkylated melamine-formaldehyde resin reaction product functioning as a dispersion stabilizer precursor, and polymerizing a vinyl monomer which does not contain hydroxyl or carboxyl functional groups in an organic liquid dissolving this stabilizer precursor (Japanese published patent application No. 11397/1972).

However, in each of the aforesaid processes it is indispensable that the melamine-formaldehyde resin or reaction product thereof must dissolve in the solvent. On the other hand, it is indispensable that the polymer be insoluble in the solvent. Accordingly, the melamine-formaldehyde resin or reaction product thereof is not likely to be included sufficiently in the polymer particles. Further, because carboxyl groups are not present in the polymer particles, acceleration is not likely to occur in the cross-linking reaction.

Japanese patent Application publication No. 21581/1972 relates to a process for preparing a stable polymer dispersed liquid, which process comprises copolymerizing vinyl monomers consisting of alkyl acrylates, alkyl methacrylates, styrene, acrylonitrile and an acryl amide which does not contain any —OH or —COOH functional groups, in the presence of a liquid obtained by dissolving an alkylated melamine-formaldehyde reaction product in an aliphatic hydrocarbon, with an acrylic acid monomer or methacrylic acid monomer having an —OH and/or —COOH functional group. However, in this case also, the copolymer is insoluble in the solvent, because a substance is used which is soluble in the aliphatic hydrocarbon. The melamine-formaldehyde reaction product is not likely to be included in the polymer particles.

The present invention overcomes the foregoing disadvantages, providing a stable dispersed liquid of a copolymer having a uniform composition.

STATEMENT OF THE INVENTION

The present invention relates to an organic liquid dispersed liquid of a copolymer of the vinyl series. More particularly, the invention relates to an organic liquid dispersed liquid comprising a copolymer of the vinyl series obtained by polymerizing at least two different types of monomers of the vinyl series in the presence of a block or graft copolymer of the vinyl series containing a component which solvates in a dispersion medium ($\alpha$) and a component which does not solvate in the dispersion medium, but which is compatible with a copolymer of the vinyl series which is dispersed in the dispersion medium (dispersed polymer) ($\beta$) in an organic liquid, in which the copolymer of the vinyl series ($S_1$) to be produced in soluble and, at that time, adding an alkylated melamine-formaldehyde reaction product before, during or after the polymerization to the reaction system and mixing it uniformly therewith, and thereafter distilling out a specified component of the organic liquid in the solution of the copolymer of the vinyl series obtained above or adding anew an organic liquid in order to vary the difference of solubility parameters, between said copolymer ($S_1$)

and a dispersion medium of the final dispersed liquid ($S_2$), by at least 0.5.

DETAILED DESCRIPTION OF THE INVENTION

The block or graft copolymer of the vinyl series used in the present invention as a dispersion stabilizer contains a component which salvates in a dispersion medium of a dispersed liquid of a copolymer of the vinyl series (a) obtained by the present invention and a component ($\beta$) which does not solvate in said dispersion medium, but which is compatible with a dispersed polymer.

The aforesaid components ($\alpha$) and ($\beta$) are bound directly or via a third component ($\gamma$) by a method involving block or graft copolymerization to form the aforesaid block or graft copolymer of the vinyl series. The volume ratio of the component ($\alpha$) to the component ($\beta$) extends through a broad range centering about equal weight proportions; said ratio is preferably about 0.2 – 5, especially preferable about 0.4 – 2.5.

The expression "component ($\alpha$) which solvates in a dispersion medium", as referred to in the present specification, refers to a component which dissolves completely when added into the dispersion medium.

When the dispersion medium is composed mainly of an aliphatic hydrocarbon (or an alicyclic hydrocarbon), for example, pentane, hexane, heptane, octane, cyclohexane, methyl cyclohexane, ethyl cyclohexane and dimethyl cyclohexane, examples of components solvating in these dispersion media include polymers such as ethylene, propylene and butadiene, polymers mainly composed of higher alcohol esters of acrylic acid or methacrylic acid (the number of carbon atoms in the alkyl group is 8 – 18), for example, esters of 2-ethylhexyl, octyl, lauryl and stearyl alcohols, and polymers composed mainly of a vinyl ester of a long chain aliphatic monobasic acid (having 10 – 18 carbon atoms), for example vinyl stearate.

When the dispersion medium is composed mainly of an aromatic hydrocarbon such as, for example, toluene, xylene, alkyl benzene and solvent naphtha, proper examples of components solvating in this dispersion medium include polymers such as ethylene, propylene and butadiene, polymers composed mainly of a higher alcohol ester of acrylic acid or methacrylic acid (the number of carbon atoms in the alkyl group is 8 – 18) such as, for example, esters of 2-ethylhexyl, octyl, lauryl and stearyl alcohols, and polymers composed mainly of esters of long chain monobasic acids (having 10 – 18 carbon atoms) such as, for example, vinyl stearate, polymers composed mainly of lower alcohol esters of acrylic acid or methacrylic acid (the number of carbon atoms in the alkyl group is 1– 7, preferably 1 – 4) such as, for example, methyl methacrylate or ethyl acrylate, and cellulose derivatives such as ethyl cellulose and cellulose acetate butyrate.

When the dispersion medium has a relatively weak polarity such as, for example, one composed of ether ester, esters such as ethyl acetate, butyl and amyl, ketones such as methylethyl ketone and methylisobutyl ketone and higher alcohols such as lauryl alcohol and octyl alcohol, proper examples of components solvating in these dispersion media include polymers mainly composed of a lower alcohol ester of acrylic acid or methacrylic acid (the number of carbon atoms in the alkyl group is 1 – 4), for example, methyl acrylate, ethyl acrylate, methyl methacrylate and ethyl methacrylate, aliphatic polyethers, saturated or unsaturated aliphatic or aromatic polyesters and polymers of methyacrylates of aliphatic polyethers, and cellulose derivatives such as cellulose acetate butyrate.

When the dispersion medium has a relative strong polarity such as, for example, one composed of methyl alcohol, ethyl alcohol or isopropanol, proper examples of components which solvate in these dispersion media include polymers mainly composed of acrylic acid, methacrylic acid and vinyl pyrrolidone, polymers mainly composed of polyvinyl alcohol and vinyl alcohol, and polymers mainly composed of hydroxy ethyl methacrylate.

The expression "component ($\beta$) which does not solvate in the dispersion medium, but which is compatible with the dispersed polymer" as referred to herein should have a polarity which is remarkably different from that of the solvating component ($\alpha$).

That the component ($\beta$) does not solvate is established by the fact that when this component only is added to the disperion medium, it does not dissolve in said medium. That the component ($\beta$) is compatible with a copolymer of the vinyl series which is dispersed polymer is established by the facts that when the copolymer of the vinyl series and this component are dissolved in a common solvent, phase separation does not take place, and that when a film is made from this solution, the film does not become opaque.

Examples of such component ($\beta$), for example, when the dispersion medium is an aliphatic hydrocarbon, include polymers mainly composed of acrylate or methacrylate of lower alcohols (having 1 – 7 carbon atoms). When the dispersion medium is an aromatic hydrocarbon, a polymer mainly composed of acrylonitrile or vinylidene chloride is suitable. When the dispersion medium is one having low polarity, a polymer mainly composed of acrylate or methacrylate of a lower alkyl group (having 1 – 7 carbon atoms) is suitable. When the dispersion medium has high polarity, a polymer mainly composed of styrene, butadiene or various olefins such as ethylene and propylene is suitable.

Besides these, an acrylic acid or methacrylic acid ester of a high alkyl group (having 8 – 18 carbon atoms), or polymers or copolymers of compounds such as acrylamide, vinyl chloride and vinyl acetate may be used in accordance with the polarity of the dispersion medium.

In accordance with the present invention, a copolymer of the vinyl series which is a dispersed polymer is in many cases a copolymer composed of several components. Therefore, it is especially preferable that a component which does not solvate in the dispersion medium be a copolymer of a composition which is similar to that of the dispersed polymer.

With reference to the block or graft copolymer of the vinyl series containing the aforesaid components ($\alpha$) and ($\beta$), when the solubility parameter of the component ($\alpha$) is designated $\delta\alpha$, and the solubility parameter of the component ($\beta$) is designated $\delta\beta$, it is preferable that the difference between $\delta\alpha$ from $\delta\beta$ be at least about 1.

The solubility parameter (S.P) mentioned above and below is defined by the following equation and calculated from inference of the molecular structure.

$$\text{S.P} \, (\text{cal}^{1/2}/\text{cc}^{1/2}) = \sqrt{CDE} = d\Sigma G/M$$

wherein

*CDE:* Cohesive energy density
*d:* Density
*M:* Molecular weight of the constitutional units
*G:* Molecular attraction constant (sum total of molecular attraction constants between atoms and atomic groups in the molecule).

Details on the solubility parameter appear in P. S. Small: Journal of Applied Chemistry, 3, p 71 – 80 (1948) and Polymer Handbook (Interscience Publishers) (1966).

When the solubility parameter of a copolymer is sought, S.P values of the respective components constituting said copolymer are calculated from the aforementioned equation, and the values obtained are multiplied by the respective mol fractions.

For example, in the case of a styrene-methyl methacrylate copolymer (styrene, 40 mol %, methyl methacrylate: 60 mol %), the S.P is determined as follows.

| Constitutional component of a styrene unit | Molecular attraction constant |
|---|---|
| $-CH_2$ | 133 |
| $-CH-$ | 28 |
| $-C_6H_5$ | 735 |
| | 896 |

Accordingly:
$$\text{S.P (styrene unit)} = \frac{1.05 \times 896}{104} = 9.05$$

| Constitutional component of a methyl methacrylate unit | Molecular attraction constant |
|---|---|
| $-CH_2-$ | 133 |
| $-C-$ | $-93$ |
| $-CH_3$ | $214 \times 2$ |
| $-COO$ | 310 |
| S.P (methyl methacrylate unit) | 778 |

Accordingly: $= \frac{1.20 \times 778}{100} = 9.34$

Consequently:
S.P of the copolymer $= 9.05 \times 0.4 + 9.34 \times 0.6 = 9.22$

A block or graft copolymer consisting of the component ($\alpha$) and the component ($\beta$) may be prepared either by block or graft copolymerizing monomers constituting the component ($\beta$) in the presence of the component ($\alpha$), or by block or graft copolmerizing monomers constituting the component ($\alpha$) in the presence of the component ($\beta$). Generally, however, the former method is preferably used. In this case in order smoothly to proceed with the block or graft copolymerization, it is advantageous to introduce a double bond into the polymer component [component ($\alpha$) or component ($\beta$)].

It is possible to bind the component ($\alpha$) to the component ($\beta$) via a third component ($\gamma$). Namely, a block or graft copolymer consisting of the component ($\alpha$) and the component ($\beta$) bound via a component ($\gamma$) is obtained by, for example, polymerizing the monomer constituting the component ($\alpha$) in the presence of the component ($\gamma$) to form a bonded body of the component ($\gamma$) and the component ($\alpha$), and subsequently polymerizing the monomer constituting the component ($\beta$) in the presence of this bonded body. The component ($\gamma$) may be any compound which is copolymerizable with monomers constituting the components ($\alpha$) and ($\beta$). However, from the viewpoint of dispersion stablity, it is especially preferable to use cellulose acetate butyrate. In this case, it is preferable to use a dispersion medium mainly composed of the aforesaid aliphatic hydrocarbon, acrylate or methacrylate of a hgher alkyl (having 8 – 18 carbon atoms, preferably 12) as the monomer constituting the component ($\alpha$) and an acryl copolymer composed of acrylate or methacrylate of a lower alkyl group (having 1 – 7 carbon atoms), preferably ethyl acrylate and styrene as the monomer constituting the component ($\beta$).

As the monomer constituting the component ($\gamma$), amino alkyl acrylate or methacrylates such as diethylaminoethyl acrylate or methacrylate, tertiary butyl aminoethyl acrylate or methacrylate and dimethyl aminoethyl acrylate or methacrylate, and monomers such as aminoethylvinyl ether and aryl (allyl) methacrylate are preferably used. In this case, the block or graft copolymer composed of the component ($\alpha$) and the component ($\beta$) via the component ($\gamma$) is obtained by polymerizing a mixture of these monomers and a monomer constituting the component ($\alpha$), and polymerizing a monomer constituting the component ($\beta$) in the presence of the resulting copolymer.

The aforesaid block or graft copolymer of the vinyl series which functions as a dispersion stabilizer may be formed simultaneously, when the copolymer of the vinyl series which becomes a dispersion polymer is produced.

The copolymer of the vinyl series which becomes the dispersion polymer is obtained by polymerizing at least two different types of monomers of the vinyl series in an organic liquid in which the copolymer product is soluble. At that time, a dispersion stabilizer is caused to co-exist. Regarding the volume ratio of the copolymer of the vinyl series which is destined to become a dispersion polymer to the volume of the dispersion stabilizer, a range of about 20 – 0.5 is suitable, preferably about 10 – 1.5.

It is preferable that the solubility parameter $\delta S_1$ of the organic liquid used for solution polymerization of said at least two kinds of monomers of the vinyl series be, when the solubility parameter of the produced copolymer of the vinyl series $\delta P$ is used as a basis, within the range of about $\delta S_1$ $\delta P \pm 0.5$. However, even though the solubility parameter of the organic liquid is outside this range, so long as such liquid dissolves said copolymer, such organic liquid may be used.

Regarding the weight ratio of the organic liquid to the polymer components, a range of about 10 – 90% of the organic liquid based on the entirety is ordinarily used, and a range of about 20 – 70% based on the entirety is especially preferable.

In order to obtain a very stable dispersed liquid of the present invention from a solution of a copolymer of the vinyl series to become a dispersion polymer it is necessary that the difference in solubility parameter of the organic liquid ($S_1$) used for solution polymerization of said monomer of the vinyl series from the dispersion medium of the final dispersed liquid ($S_2$) should be varied by at least about 0.5. In order to vary the solubility parameter, it is possible to add another organic liquid or in the case of an organic liquid in which the polymerization medium consists of at least two components, to distil out and remove some component therein. At this time, uniformly mixing the reaction system is important for obtaining a good dispersion polymer. It is preferable that the solubility parameter of the organic liquid of the final dispersed liquid, when the solubility parameter of the component ($\alpha$) of the dispersion stabilizer is used as a basis be within about 0.5 in difference.

It is preferable that the main polymer of the present invention be a copolymer of vinyl monomers manly composed of an alkyl ester of an acrylate or methacrylate. The number of carbon atoms of the alkyl of which is about 1 - 7. However, as will be mentioned later, polymers such as styrene, vinyl toluene, butadiene and higher alkyl esters of acrylates or methacrylates may be used as well.

Because of the kind of organic liquid of the final dispersed liquid and the kind of dispersion stabilizer change, the entire framework will be shown by specific examples of main cases.

When the main polymer is a polymer having medium polarity like those in the thermosetting or thermoplastic copolymers of the acryl series:

The main component of the polymer in this case is composed of a lower alcohol ester of acrylic acid or methacrylic acid (the number of carbon atoms in the alkyl group is 1 - 4), for example, methyl methacrylate, butyl methacrylate, ethyl acrylate and butyl acrylate are the main components. In this case, suitable organic liquids dispersion media include aliphatic hydrocarbons, aliphatic hydrocarbons containing a small amount of an aromatic hydrocarbon such as mineral spirits, white spirits, ligroin, turpentine oil and solvent kerosene or a mixture of these liquids and a small amount of a liquid having high polarity, such as esters, ketones and alcohols. In this case, suitable organic liquids for polymerization include aromatic hydrocarbons, esters, ketones and alcohols alone, and mixed liquids composed mainly thereof. When distilling out and removing a polar liquid after polymerizing a copolymer of the vinyl series to make a final composition of an organic liquid, for example, a mixture of an alcohol and an aliphatic hydrocarbon or a mixture of an alcohol and white spirits is suitable. As a dispersion stabilizer, as mentioned above, polymers shown as preferable examples when the main component of the organic liquid is an aliphatic hydrocarbon may be used.

Referring to the thermosetting copolymers of the acryl series as copolymers of the vinyl series with the main polymer, as mentioned above, these copolymers may be composed mainly of the lower alcohol esters of acrylic acid or methacrylic acid. They may contain as a thermosetting functional group, a hydroxyl group, carboxyl group, glycidyl group, amide group, methylol amide group or an N-alkoxymethyl amide group. With respect to the lower alcohol ester of acrylic or methacrylic acid, methyl acrylate, ethyl acrylate, butyl acrylate, methyl methacrylate, ethyl methacrylate, isobutyl methacrylate and butyl methacrylate are especially preferable examples. A copolymer containing at least about 50% of one or more of these monomers, the aforementioned functional group component and small amounts of the other vinyl monomers is an example of an especially preferable polymer.

The solution polymerization of these copolymers of the acryl series is carried out in the organic liquid which is a solvent for the resulting copolymer. For that end, various known polymerization methods are used. However, radical polymerization is especially preferable. This polymerization is carried out in the presence of a so-called radical polymerization catalyst such as various peroxide catalysts and catalysts of the azo type. The polymerization temperature and time vary depending upon the kind of monomers used, kind of catalyst and kind of organic liquid. However, the polymerization is ordinarily carried out at a temperature within the range of about 50° - 150° C. It is especially appropriate that the polymerization be carried out at a temperature within the range of about 70° - 120° C. The polymerization time that is employed is a time greater than that necessary for the substantially complete polymerization of the monomers. The polymerization catalyst is properly added later as occasion demands.

Regarding the dispersion stabilizer, separate components or a solvating component may be formed, and as soon as the polymer is produced the dispersion stabilizer is produced by graft polymerizing the resulting polymer with said solvating component.

The alkylated melamine-formaldehyde reaction product used in accordance with the present invention is obtained by condensing melamine and formaldehyde in the pesence of alkanol. A melamine-formaldehyde condensation product having an alkyl group derived from a higher alcohol ranging from methanol. methanol, ethanol, propanol through lauryl alcohol as the upper limit gives an excellent finished film. Of these, a butylated melamine-formaldehyde condensation product is especially preferable. Because these condensation products are well known in the field of coating, conventional methods may be employed for the preparation of the condensation product used in the present invention. The amount of melamine-formaldehyde condensation product may be varied through a broad range. Regarding the amount of melamine-formaldehyde condensation product based upon all copolymer components, a range of about 3 - 50% by weight of the condensation product is preferable based on about 55 - 97% by weight of the copolymer components. The range of about 10 - 30% by weight of the condensation product based thereon is especially excellent.

According to the present invention, upon preparing an organic liquid dispersed liquid of a copolymer of the vinyl series, polymerization is carried out in a soluble organic liquid in the presence of a dispersion stabilizer and, at that time, polymerization is carried out in the presence of an alkylated melamine-formaldehyde reaction product or an alkylated melamine-formaldehyde reaction product is added to the reaction system after the polymerization has been effected, and the reaction product is uniformly mixed with the resulting polymer. Thereafter an organic liquid is added so as to vary the solubility parameter of the organic liquid of the solution by at least 0.5.

The alkylated melamine-formaldehyde reaction product may be added before polymerization when monomers of the vinyl series are polymerized in the presence of a dispersion stabilizer or may be mixed with monomers of the vinyl series and polymerization may be carried out in the resulting mixture. As such, in the case of carrying out polymerization of monomers of the vinyl series in the presence of the alkylated melamine-formaldehyde reaction product, there is advantage that the compatibility of the alkylated melamine-formaldehyde reaction product with a copolymer of the vinyl series tends to increase. Accordingly, in the case of using as a copolymer of the vinyl series, monomers of the vinyl series having poor compatibility with the alkylated melamine-formaldehyde reaction product, polymerization of the monomers of the vinyl series in the presence of the alkylated melamine-formaldehyde reaction product is very effective from the viewpoint of advancing compatibility. Or the alkylated melamine-formaldehyde reaction product may be added after the monomers of the vinyl series are polymerized. Because the dispersed liquid is prepared by adding anew an organic liquid to a solution obtained by adding the alkylated melamine-formaldehyde reaction product so as to vary the solubility parameter of the organic liquid of said solution by at least 0.5, the form of the reaction system changes in the direction in which the alkylated melamine-formaldehyde reaction product and the copolymer of the vinyl series are included in the polymer particles and the reaction system is stabilized by a dispersion stabilizer.

In forming a dispersed liquid in the presence of the alkylated melamine-formladehyde reaction product after solution polymerization of a copolymer of the vinyl series which is the main polymer, as mentioned above, a method is employed which involves adding to the organic liquid after the solution polymerization, for example, a liquid which is more non-polar than said organic liquid. Alternatively, for example, distilling out and removing a polar liquid from the organic liquid under atmospheric or reduced pressure may be employed. For enhancing the utility of the dispersed liquid, a higher concentration provides more desirable properties. Therefore, the steps of distilling out and removing the polar liquid from the organic liquid are preferable.

Regarding the organic liquid for polymerization, when adopting the method of distilling out and removing the polar liquid, a mixed liquid is used having at least two components, consisting mainly of a high boiling point non-polar organic liquid and a low boiling point polar organic liquid.

A mixed liquid consisting mainly of a relatively high boiling point aliphatic hydrocarbon is used, such as, for example, mineral spirits, solvent kerosene and white spirits and a reltively low boiling point organic liquid of the ester, ketone and alcohol type such as, for example, ethyl acetate, methylethyl ketone and isopropanol. After solution polymerization, part or all of the organic liquid of the ester, ketone and alcohol type is heated under reduced pressure, distilled out and removed. Regarding the organic liquid for polymerization, when the method of adding a non-polar liquid is adopted, an organic liquid consisting of one or more components dissolving the produced polymer is used, to which a non-polar organic liquid is added after completion of the polymerization step. A mixed solvent of an aromatic hydrocarbon such as, for example, toluene and xylene, and butanol, isopropanol and ethyl acetate are preferred, and a method of adding thereto, an aliphatic hydrocarbon such as mineral spirits and solvent kerosene after completion of the polymerization is adopted. The state of the dispersed liquid after dispersing operations is stable to mechanical strengths and to cyclical heating and cooling tests (cooling to 20° C and then restoring to room temperature), in which the main polymer assumes the form of dispersed particles having a main particle diameter within the range of about 0.1 - 10 microns.

When the main polymer is composed mainly of styrene, vinyl toluene, butadiene or a higher alcohol ester of acrylic acid or methacrylic acid, the number of carbon atoms of the alkyl group is 8 - 18.

A suitable organic liquid in this case is, for example, a lower alcohol, acetone and dimethyl formamide. As the organic liquid used for polymerization in this case, a non-polar organic liquid which is compatible with these polar organic liquids or a mixture of such non-polar organic liquids and these polar organic liquids is suitable. For example, an aliphatic hydrocarbon, mineral spirits and an aromatic hydrocarbon or a mixed solvent thereof with isopropanol and acetone is used. When the non-polar liquid is distilled out and removed after polymerization of the main polymer to make the final organic liquid, a mixture of, isobutanol and hepatane, for example, is preferable. As a dispersion stabilizer, as mentioned above, the polymers shown above are preferably used; an organic liquid relatively strong in polarity is used.

The conditions of solution polymerization of the main polymer and the formation of dispersed liquid of the main polymer after solution polymerization of the main polymer may be made the same as those in the aforementioned case, composed mainly of a copolymer of the acryl or methacryl series.

For forming a dispersed liquid of the main polymer after solution polymerization thereof, there are two methods which are the same as in the aforesaid case involving a copolymer of the acryl (methacryl) series. In the case of the method of distilling out and removing a non-polar liquid, a mixed liquid containing at least two components consisting mainly of a high boiling point polar organic liquid and a low boiling point non-polar organic liquid is used. For example, a mixed liquid consisting mainly of a mixture of a relatively low boiling point aliphatic hydrocarbon such as heptane and hexane and a relatively high boiling point polar solvent such as butanol, methylisobutyl ketone and dimethyl formamide is used, and a part or all of said aliphatic hydrocarbon is heated under a reduced pressure, distilled out and removed after solution polymerization.

The resulting dispersed liquid has a milky, opaque appearance, having stability to changes of mechanical strength and having a cooling cycle in which the main polymer becomes dispersed particles having a main particle diameter within the range of about 0.1 - 10 microns.

When the main polymer has a strong cohesion or micro crystals, for example, a copolymer consisting mainly of, for example, acrylonitrile, vinyl chloride or vinylidene chloride, it is necessary to carry out solution polymerization in solvent systems of the respective copolymer series. However, the organic liquid forming the dispersed system may be selected from quite a broad range. For example, an aliphatic hydrocarbon, aromatic hydrocarbon, ester, ketone or alcohol may be used. Accordingly, the range from which selection of the component ($\alpha$), solvating in an organic liquid is made, is broader than those of the aforementioned cases of the main polymers of the acryl (methacryl) series and hydrocarbon series.

When the effects obtained by the present invention are compared with those of conventional methods of preparing dispersed liquids by dispersion polymerization, the following characteristics may be observed.

1. Because a main polymer of a more uniform composition is obtained, when a dispersed liquid of the present invention is used as a covering composition, a more excellent film performance is obtained.

2. Because control of molecular weight is easy, a low molecular weight polymer, which is useful as a covering composition, tends to be obtained.

3. Because an alkylated melamine - formaldehyde reaction product tends to enter the polymer particles, problems such as poor hardening or slow cross-linking caused by the dispersed particles are overcome.

Hereinbelow, an explanation will be made by reference to examples, in which S.P. indicates solubility parameter.

Control 1

A butylated melamine - formaldehyde resin was prepared as follows.

A mixture of 210 parts of melamine, 760 parts of butylated formaldehyde, 168 parts of butyl alcohol, 60 parts of xylol, 0.36 part of phthalic anhydride and 2 parts of formic acid was heated in a flask equipped with a stirrer, a thermometer and a cooler, 200 parts of reaction water was removed by azeotropic distillation at a reaction temperature of 120°C over a period of about 3 hours. The resulting product was a solution having a viscosity of about 60 poises containing 70% of a nonvolatile component (the butylated melamine - formaldehyde reaction product had an S.P. of 9.6 and the organic liquid had an S.P. of 11.0%).

The butylated formaldehyde was a solution of butyl alcohol in formaldehyde, having the following composition by weight:

| | |
|---|---|
| formaldehyde | 40% |
| water | 7% |
| n-butyl alcohol | 53% |

EXAMPLE 1

A mixture of

| | |
|---|---|
| ethylene - vinyl acetate copolymer ("Elvax No. 40") | 10 parts |
| ethyl acetate | 25 parts |
| isobutanol | 50 parts |
| Naphtha No. 5 (manufactured by ESSO) | 77 parts | was heated to dissolve the ethylene - vinyl acetate copolymer, and the resulting solution was added to

| | |
|---|---|
| lauryl methacrylate | 10 parts |
| hydroxyethyl methacrylate | 1 part |
| benzoyl peroxide | 0.3 part | and the resulting mixture was heated at 90° C for 2 hours. Thereafter, said mixture was added to

| | |
|---|---|
| methyl methacrylate | 14 parts |
| ethyl acrylate | 12 parts |
| isobutyl methacrylate | 5 parts |
| acrylic acid | 1 part |
| benzoyl peroxide | 1 part | and the resulting mixture was heated at 90° C for 3 hours, by which a solution containing the ethylene - vinyl acetate copolymer (S.P. = 8.2) grafted with a copolymer of the acryl series (S.P. = 9.4) was obtained. Said solution was further added to a mixture of the following materials in 1 hour and the resulting mixture was heated at 90° C and reacted.

| | |
|---|---|
| methyl methacrylate | 28 parts |
| ethyl acrylate | 24 parts |
| isobutyl methacrylate | 36 parts |
| hydroxyethyl methacrylate | 10 parts |
| acrylic acid | 2 parts |
| azobisisobutyronitrile | 1 part |
| (further 0.5 part after 2 hours) | |
| dodecyl mercaptan | 1.5 parts |
| ethyl acetate | 13 parts |
| isobutanol | 50 parts |
| Naphtha No. | 37 parts |

The resulting mixture was copolymerized by heating for 4 hours. The copolymer had an S.P. of 9.4 and the organic liquid had an S.P. of 9.2. The resulting solution was cooled to 70° C, to which 60 parts of a solution of the butylated melamine - formaldehyde resin product in Control 1 was added and uniformly mixed. Under a reduced pressure of 100 mm Hg, about 100 parts of the solvent consisting mainly of isobutanol was distilled out with stirring and removed. (The organic liquid had an S.P. of 8.1). The resulting liquid was a milky opaque dispersed liquid containing about 50% of solid components and having a viscosity of about 4 poises (30° C). The dispersed liquid A was allowed to stand at 50° C for two weeks. However, it was completely free from abnormality such as phase separation and sedimentation, and was stable.

The aforementioned example was repeated except for omitting isobutanol and using Naphtha No. 5 of the same weight instead of butyl acetate in carrying out the polymerization. The resulting liquid was a milky opaque dispersed liquid B similar to the liquid obtained in the aforementioned example in appearance. However, when this dispersed liquid B was allowed to stand at 50° C for two weeks, considerable phase separation and sedimentation were observed.

When the dispersed liquids A and B were applied to metal test plates and cured by heating at 150°C for 30 minutes, a good result was obtained from the dispersed liquid A, but not for B. The results were:

| Dispersed Liquid | A | B |
|---|---|---|
| appearance of film after curing | transparent | opaque |
| "pencil hardness" | 2H (tenacious) | F (brittle) |

Example 2

A mixture of

| | |
|---|---|
| Naphtha No. 5 | 80 parts |
| toluene | 50 parts |
| ethyl acetate | 20 parts |
| depolymerized rubber | 10 parts | was heated to dissolve the depolymerized rubber, and the resulting solution was added to

| | |
|---|---|
| methyl methacrylate | 16 parts |
| methacrylic acid | 4 parts |
| benzoyl peroxide | 1 part | and the resulting mixture was heated at 85° C for 2 hours, by which a solution containing the depolymerized rubber (S.P. = 8.1) grafted with a copolymer of the methacryl series (S.P. = 9.4) was obtained. While a mixture of the following materials was continuously added dropwise in 2 hours to said solution, the resulting mixture was reacted at 70° C and heated for another 2 hours.

| | |
|---|---|
| methyl methacrylate | 70 parts |
| butyl methacrylate | 20 parts |
| methacrylic acid | 3 parts |
| methacryl amide | 2 parts |

-continued

| | |
|---|---|
| hydroxypropyl methacrylate | 5 parts |
| 2,2'-azobis-(2,4-dimethyl valeronitrile) (and a further 0.5 part after 2 hours) | 1 part |
| dodecyl mercaptan | 1.5 parts |
| ethyl acetate | 18 parts |
| isobutanol | 32 parts |
| butylated melamine - formaldehyde reaction product of Control 1 | 60 parts |

The resulting copolymer of the vinyl series had an S.P. of 9.2 and the solvent at the time of solution polymerization had an S.P. of 8.9. After completion of the reaction, the pressure was reduced to 100 mm Hg and about 70 parts of a solution consisting mainly of isobutanol and ethyl acetate was distilled out with stirring and removed. The solvent of the final composition after distillation had an S.P. of 8.2. The resulting liquid was a milky, opaque dispersed liquid A containing about 50% of solid components and having a viscosity of about 6 poises (30°C). This dispersed liquid was allowed to stand at 50°C for two weeks. However, it was completely free of abnormality such as phase separation and sedimentation, and was stable.

The aforementioned example was repeated, except for omitting the ethyl acetate and isobutanol in carrying out the polymerization. The resulting liquid B was a dispersed liquid having the same appearance as that of the dispersed liquid A. However, when this dispersed liquid B was allowed to stand under the same conditions as those of the dispersed liquid A, phase separation and sedimentation was recognized. When the dispersed liquids A and B were applied to glass plates, heated and dried, the film obtained from the dispersed liquid A was transparent, but on the other hand, the film obtained from the dispersed liquid B was less transparent.

Example 3

200 parts of ethyl acetate were refluxed, to which a mixture of 95 parts of lauryl methacrylate, 5 parts of glycidyl methacrylate, 1 part of azobisisobutyronitrile and 1 part of dodecyl mercaptan were added dropwise in 1 hour and heating was continued for 3 hours. To the resulting mixture were added 2.5 parts of acrylic acid, 0.1 part of triethylbenzyl ammonium chloride and 0.1 part of hydroquinone, and the resulting mixture was heated at 60°C for 4 hours. The acid value of the resulting solution became less than 1. A polymer solution L containing an unsaturated group was obtained (the component ($\alpha$) consisting of lauryl methacrylate had an S.P. of 8.2 and the component ($\beta$) had an S.P. of 9.3). A mixture of 200 parts of ethyl acetate, 300 parts of the polymer solution L, 96 parts of methyl methacrylate, 4 parts of methacrylic acid and 1 part of azobisisobutyronitrile was heated until reflux for 2 hours, to which further 1 part of azobisisobutyronitrile was added and the resulting mixture was heated for another 2 hours to obtain a polymer solution M containing 32% of solid components.

A mixture of

| | |
|---|---|
| polymer solution M | 15 parts |
| Naphtha No. 3 (manufactured by ESSO) | 100 parts |
| ethyl acetate | 80 parts |
| cellosolve acetate | 20 parts | was heated at 90°C, to which the following mixture was added dropwise in 1 hour and the resulting mixture was heated.

| | |
|---|---|
| methyl methacrylate | 65 parts |
| isobutyl methacrylate | 20 parts |
| methacrylic acid | 2 parts |
| hydroxypropyl methacrylate | 8 parts |
| azobisisobutyronitrile | 2 parts |
| dodecyl mercaptan | 1 part |

After completion of dropwise preparation of the mixture, the temperature was reduced to 70°C, to which 35 parts of a solution of the butylated melamine - formaldehyde reaction product obtained in Control 1 were added, to the resultant mixture was further added 0.5 part of azobisiobutyronitrile and the resulting mixture was continuously heated at 70°C for 2 hours.

The main polymer after completion of the reaction had an S.P. of 9.3 and the solvent had an S.P. of 8.8. Under a reduced pressure (100 mm Hg), about 100 parts of the solvent were distilled out and removed. The solvent after distillation had an S.P. of 8.2. The resulting liquid was a milky, opaque dispersed liquid A containing about 50% of solid components. When this dispersed liquid A was allowed to stand at 50°C for 2 weeks, abnormality such as phase separation and sedimentation was not recognized at all and the dispersed liquid A was stable. When this liquid A was applied to a glass plate, heated and dried, an entirely transparent film was obtained.

On the other hand, in the preparation of the dispersed liquid A, of Naphtha No. 3, ethyl acetate and cellulose acetate to be mixed with the polymer M, instead of the latter two, a low boiling point petroleum fraction of distillate having a boiling point of 70° – 80° C was used in carrying out drop polymerization of a copolymer of the acryl series. After completion of the reaction, under reduced pressure, about 100 parts of the solvent were distilled out and removed.

The resulting liquid was a milky, opaque dispersed liquid B containing about 50% of solid components. When this dispersed liquid B was allowed to stand at 50°C for 2 weeks, sedimentation to some extent was observed. When this dispersed liquid B was applied to a glass plate, heated and dried, haze to some extend was observed.

It is considered that such phenomena of the dispersed liquid B are caused by formation of polymers which are remarkably different in distribution of copolymerization composition and remarkable expansion of distribution of the molecular weight due to non-uniform phase polymerization of the multi-component system.

Example 4

A mixture of

| | |
|---|---|
| polymer solution M prepared in Example 3 | 15 parts |
| Naphtha No. 5 (manufactured by ESSO) | 30 parts | was heated at 70°C, to which the following mixture was added dropwise in 30 minutes under a nitrogen atemosphere.

| | |
|---|---|
| methyl methacrylate | 70 parts |
| ethyl acetate | 15 parts |
| hydroxyethyl methacrylate | 2 parts |

-continued

| | |
|---|---|
| 2,2'-azobis-(2,4-dimethyl valeronitrile) | 1.5 parts |
| dodecyl mercaptan | 0.7 part |
| solution of the butylated melamine-formaldehyde reaction product of Control 1 | 35 parts | and the resulting mixture was heated for a further 30 minutes. Thereafter, 13 parts of hydroxyethyl methacrylate were added thereto and the mixture was heated for another 2 hours. To said mixture was added 0.5 part of azobisisobutyronitrile and the resulting mixture was further heated for 3 hours. The liquid product was a dispersed liquid A containing about 47% of solid components.

In the aforementioned method of preparation, the following mixture was used instead of Naphtha No. 5:

| | |
|---|---|
| Naphtha No. 5 | 100 parts |
| ethyl acetate | 80 parts |
| cellosolve acetate | 30 parts | and instead of divided addition of monomers, the entire amount of the monomers was added dropwise en masse in 1 hour and the resulting mixture was heated for a further 2 hours, to which was added 0.5 part of azobisisobutyronitrile and the resulting mixture was further heated for 2 hours. The main polymer had an S.P. of 9.3 and the solvent had an S.P. of 8.9. After completion of the reaction, under a reduced pressure, about 90 parts of the solvent were distilled out and removed. (The solvent after distillation had an S.P. of 8.2.) The resulting liquid was a dispersed liquid B containing about 42% of solid components.

When the dispersed liquids A and B were compared with each other with reference to various characteristics, the following results were obtained and it was shown that the dispersed liquid B based on the process of the present invention was superior in various respects.

| | Dispersed Liquid A | Dispersed Liquid B |
|---|---|---|
| Accelerated storage stability at 50° C for 2 weeks | Some sediment | stable |
| Transparency of film formed after heating at 100° C for 30 minutes and drying after the dispersed liquid was applied | Semi-transparent | Transparent |
| Solvent resistance of cured film after being heated at 140° C for 30 minutes after the dispersed liquid was applied | Swelled by methyl ethyl ketone | Not swelled in methylethyl ketone |
| Smoothness of the same film as above | Orange peel | Good |

It is considered that the excellence of the accelerated storage stability and the transparency of the film is due to the fact that a main polymer of a more uniform copolymerization composition is obtained and the smoothness of the film is due to the fact that control of the molecular weight has been excellent. The fact that the solvent resistance of the cured film is excellent is considered to mean that curing has proceeded and due to the fact that a butylated melamine - formaldehyde reaction product is included in the polymer particles and the polymer particles become a self-condensation type.

Example 5

6 parts of cellulose acetate butyrate (EAB 551–02; Registered Trademark of Eastman Kodak Company) were dissolved in a mixture of the following solvents:

| | |
|---|---|
| Ethylacetate | 10 parts |
| Butylacetate | 30 parts |

This solvent was charged into a vessel equipped with a stirrer and a reflux condenser.

This solution was heated to reflux temperature on a bath, and then the following first stage mixture was added while maintaining the solution under nitrogen atmosphere.

| | |
|---|---|
| Lauryl methacrylate | 20 parts |
| Hydroxy propylmethacrylate | 3 parts |
| Methacrylic acid | 0.2 part |
| Benzoyl peroxide | 0.5 part |

This mixture was maintained for 2 hours, and then 0.2 part of benzoyl peroxide were added 2 times at intervals of 1 hour, and after that the mixture was held for 2 further periods of 2 hours.

After that, the following second stage mixture was dripped in at a constant rate over a period of 2 hours:

| | |
|---|---|
| styrene | 30 parts |
| ethylacrylate | 35 parts |
| n-butylmethacrylate | 10 parts |
| lauryl methacrylate | 5 parts |
| hydroxyethylmethacrylate | 16 parts |
| acrylic acid | 1.5 parts |
| benzoyl peroxide | 2.5 parts |

This mixture was maintained for 2 hours, and then 0.5 part of azobisisobutyronitrile were added and the mixture was heated for a further period of 2 hours to ensure complete reaction.

The solution thus obtained consisted of the mixture (S.P. = 9.0) of acrylic polymers, the stabilizer based on cellulose acetate butyrate as trunk polymer, and the mixture (S.P. = 8.6) of the solvents as previously stated.

The solution was cooled to 60°C and then the following third stage solution was added:

| | |
|---|---|
| Butoxymethylmelamine solution (N.V = 60%, solvent; iso-BuoH/Xylole = 50/50 wt%) | 60 parts |

Then the following fourth stage mixture of solvents were added with vigorous stirring.

| | |
|---|---|
| n-heptane | 48 parts |
| "Isoper E"[2] | 48 parts |

[2] Registered trademark of ESSO Standard Oil Co. for aliphatic hydrocarbon (B.P = 115 – 142° C)

The solution began to become turbid after addition of the solvent of aliphatic hydrocarbon with stirring. The polymer dispersion was prepared by the process above mentioned. The S.P. of the solvent mixture after addition of the aliphatic hydrocarbon was 7.9. The resulting varnish was a whitened dispersion and its Gardner viscosity was V at 25°C. Though this dispersion was stored for 1 month at room temperature, it was so stable that no change occurred at all.

A pigment paste was made by using a mixer to disperse the following:

| | |
|---|---|
| Resulting varnish | 100 parts |
| Aluminium paste (70%) | 5 parts |

This mixture was diluted with a thinner composed of 90 parts of Isoper E (registered trademark of ESSO Standard Oil Co. for aliphatic hydrocarbon) and 10 parts of carbitol acetate to a settlement time of 18 seconds (Ford Cup No. 4). The total solids content was 45%. This diluted composition was sprayed onto a tin panel to form a smooth film at a dry film thickness of 30 μ. Panels thus coated were allowed to stand for 10 minutes and then heated to 140°C for half an hour. The resulting film was free from sags and solvent-popping and had excellent working properties for metallic finishes, uniform high gloss, mirror-like appearance and had the feel of a thicker film.

What is claimed is:

1. In a method of making a polymer dispersed liquid, the steps which comprise polymerizing at least two different types of monomers of the vinyl series in an organic liquid or in a mixed organic liquid containing at least 2 components which is able to dissolve the resulting copolymer of the vinyl series in the presence of a block or graft copolymer, said copolymer containing
   a. a component composed of a polymer of a higher alkyl ester of acrylic acid or methacrylic acid, wherein the number of carbon atoms of the alkyl group is 8 – 18, and
   b. a component composed of a polymer the majority of which is a lower alkyl ester of acrylic acid of methacrylic acid, wherein the number of carbon atoms of the alkyl group is 1 – 7 and, at that stage, adding an alkylated melamine-formaldehyde reaction product to the reaction system before, during or after the polymerization reaction, and uniformly mixing said reaction product in said reaction system, and thereafter adding another organic liquid or distilling out at least one component in the mixed organic liquid in order to vary the solubility parameter of the organic liquid by at least 0.5, the majority of the final dispersion medium being an aliphatic hydrocarbon.

2. Method according to claim 1, wherein said dispersion medium contains a majority of an aliphatic hydrocarbon, and said block or graft copolymer of the vinyl series is a copolymer obtained by polymerizing a member selected from the group consisting of acrylate or methacrylate of a lower alkyl group having 1 – 7 carbon atoms and styrene, in the presence of a copolymer obtained by polymerizing an acrylate or methacrylate of a higher alcohol having 8 – 18 carbon atoms in the presence of cellulose acetate butyrate.

3. A polymer dispersed liquid produced by the process of claim 1.

* * * * *